July 30, 1963   J. W. POLISEO   3,099,222
PUMP
Filed May 10, 1962
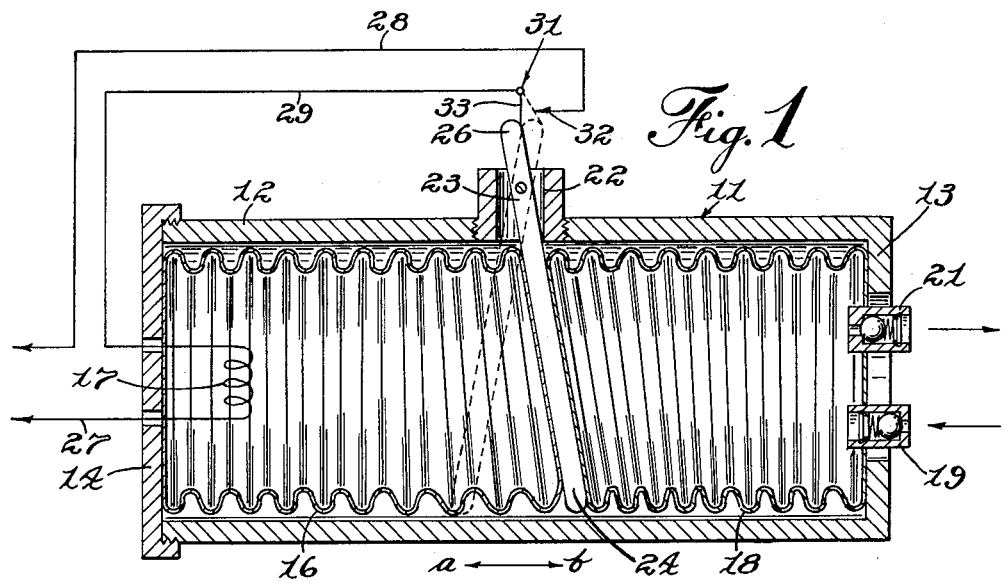
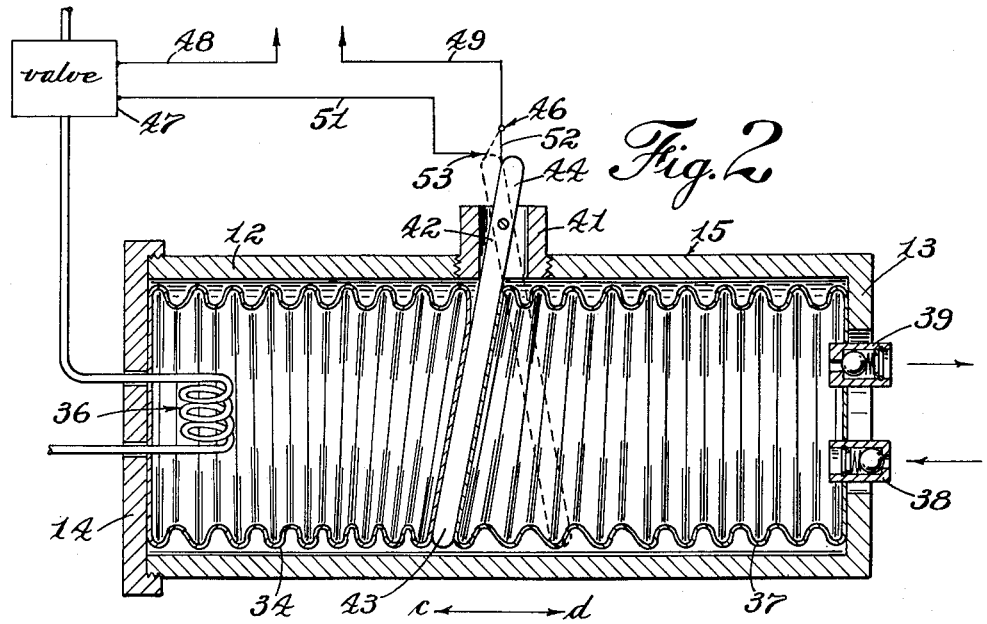
WITNESS:
INVENTOR.
Joseph W. Poliseo
BY
John Phillips Ryan
ATTORNEY United States Patent Office
3,099,222
Patented July 30, 1963

3,099,222
PUMP
Joseph W. Poliseo, Elmira, N.Y., assignor to The Bendix Corporation, Elmira Heights, N.Y., a corporation of Delaware
Filed May 10, 1962, Ser. No. 193,697
18 Claims. (Cl. 103—152)

The present invention relates to a pump and more particularly relates to a pump wherein the contractive and expansive movements of opposed and contained bellows provide the pumping action.

This application is a continuation-in-part of my copending application Serial No. 92,291 filed February 28, 1961, now abandoned.

Many applications presently exist for a relatively slow acting pump. Two such applications exist in modern air-conditioners and dehumidifiers where the elimination of accumulated condensation poses a serious problem. Most air-conditioners and dehumidifiers accumulate condensation in a well or sump exterior of the cooled area. This condensate may be allowed to evaporate in the equipment housing or it may be drained by one or more drain orifices provided in the housing. The first described means of elimination which relies upon evaporation is undesirable in the event that there is an abnormal accumulation of condensate and further it is conducive to causing the metal housing which the well is formed to corrode and/or rust. The second described means of elimination is undesirable in that it requires gravity as a means of disposal and thus limits the positioning of the air-conditioner or dehumidifier and further it is an undesirable means of elimination because the direction of flow taken by the disposed condensate cannot be easily controlled or directed. A small pump contained within the housing of the equipment can be utilized with a very small well or sump to disposed of any accumulated condensation in an effective, convenient and continuous manner.

Briefly, the present invention contemplates the provision of a support housing containing and confining a pair of bellows structures. One of the bellows is a hermetically sealed unit preferably containing an entrapped fluid, preferably a gaseous medium. This first bellows has provided therein thermal actuator means which can be intermittently energized to cause either the expansion or contraction of the entrapped medium whereby the bellows is caused to expand or contract in a controllable manner. The first bellows will normally assume an expanded condition if the thermal actuator operates on a cooling principle or it will normally assume a contracted condition if the thermal actuator operates on a heating principle. A second bellows in the housing substantially in abutting engagement with the first bellows is provided with an inlet and an outlet valve operably connected thereto and extending beyond the housing. This second bellows will normally assume a contracted condition if the first bellows' normal condition is an expanded condition and conversely the second bellows will normally assume an expanded condition if the first bellows' normal condition is a contracted condition. When the thermal actuator means is energized it will cause the first bellows to move toward and assume an opposite condition (contracted if the thermal actuator operates on a cooling principle, expanded if the thermal actuator operates on a heating principle) and because of the abutting engagement between the first and second bellows a concomitant movement will take place in the second bellows (expansion if the thermal actuator operates on a cooling principle, contraction if the thermal actuator operates on a heating principle). The suction created within the second bellows during its expansive movement is directed by means of the inlet valve to a well, a sump or source of fluids to be pumped and causes the fluids to be drawn into the second bellows. The contraction of the second bellows causes a controllable discharge of the fluids to be pumped via the outlet valve. Control means responsive to the movements of the bellows alternately energizes and de-energizes the thermal actuator means to cause the cyclical action desired.

It is an object of the invention to provide a pump which is facile, efficient and economical.

It is another object of the invention to provide a pump wherein the pumping action is accomplished by the contractive and expansive movements of opposed bellows.

It is still another object of the invention to provide a pump having controllably confined bellows wherein one of the bellows is hermetically sealed and contains an entrapped medium having a thermal coefficient of expansion or contraction which, when subject to thermal actuation, will cause the rapid expansion or contraction movement of the bellows away from its normally contracted or expanded condition, and will concomitantly cause opposite movements in the opposed bellows.

It is still another object of the invention to provide a pump having controllably confined bellows wherein one of the bellows is hermetically sealed and contains an entrapped medium which, when subjected to heat, causes an expansive movement of the bellows, and, when cooled, allows the bellows to rapidly assume its normally contracted condition.

It is still another object of the invention to provide a pump having controllably confined bellows wherein one of the bellows is hermetically sealed and contains an entrapped medium which, when cooled, causes a contractive movement of the bellows, and, when allowed to become warmed causes the bellows to rapidly assume its normally expanded condition.

It is still another object of the invention to provide a pump having controllably confining bellows, wherein one of the bellows is provided with inlet and outlet valves and which, when expanding or contracting, exerts a pressure or suction which coacts with the inlet and outlet valves to produce a pumping action.

It is a further object of the invention to provide a pump including means responsive to the contractive and expansive movements of opposed bellows to control said movements and to insure cyclical contractive and expansive movements of the bellows.

Further objects and advantages of the invention will be apparent from the following description and claims, and from the accompanying drawing in which:

FIGURE 1 is a side elevational view, in section, illustrating a pump embodying the invention; and FIGURE 2 is a side elevational view similar to FIGURE 1 but illustrating a modified embodiment of the invention.

Corresponding reference characters indicate corresponding parts throughout the two views of the drawing.

Referring to FIGURES 1 and 2, the pump of the present invention is generally designated as 11 and 15, respectively, and comprises a hollow cylindrical housing 12 which is closed at its extremities 13 and 14, respectively.

Supported within the housing of the pump 11 illustrated in FIGURE 1, adjacent the housing extremity 14, is a hermetically sealed bellows 16 which normally assumes a contracted condition. The bellows may be anchored to the extremity 14 if so desired. The bellows preferably contains a medium having a high coefficient of expansion, such as ethyl alcohol, but is, of course, not limited thereto. Within the bellows 16 there is provided a heating element, generally designated as 17, which is in heat transfer contact with the entrapped medium. While the heating element is illustrated and described as being electrically energized, it will be readily apparent to those skilled in the art that other thermal actuator means are adaptable for performing this function. These other thermal actuator means will be hereinafter more completely described.

Supported within the housing 12, adjacent the housing extremity 13, is a second bellows 18 which may, if desired, be secured to the housing extremity 13. Bellows 18 normally tends to assume an expanded position. Secured to the second bellows are ball-type inlet and outlet valves 19 and 21, respectively. The valves extend through the housing extremity and can be attached to tubing or conduit (not shown).

A passage 22, substantially centrally located on the housing 12, opens to the interior of the housing. Pivotally supported on the housing in the passage is a lever 23 having an elongated portion 24 extending into the housing cavity intercalated between the adjacent extremities of the bellows 16 and 18. A shortened portion 26 of the lever extends outwardly beyond the housing to provide an actuator for an interrupter switch generally designated as 31.

A source of electrical energy is connected to the heat generating means by wire leads 27, 28 and 29. The lead 27 is directly connected between the source of electrical energy and the heating element 17. The interrupter switch 31 is positioned adjacent the portion 26 of the lever 23 and is interposed between the leads 28 and 29. The lead 28 is connected between the source of electrical energy and a fixed contact 32 of the switch, while the lead 29 is connected between a movable contact 33 of the switch and the heating element 17. The movable contact 33 is illustrated as a dependent lever-like means having contact with the lever portion 26 which supplies a motivating force thereto. Reciprocal movement of the lever 23, responsive to the contractive and expansive movements of the bellows, causes similar movements to be imparted to the movable contact 33 causing it to make and break with the fixed contact 32.

In operation, when the entrapped medium within the bellows 16 is heated, the bellows expands from its normally contracted condition. The bellows 16 in FIGURE 1 is illustrated in its expanded condition. Since the bellows is controllably confined within the housing 12 the only direction its expansive movement can take is toward the adjacent extremity of the normally expanded bellows 18. The expansive movement causes the bellows 16 to initially engage the portion 24 of the lever 23 urging it into engagement with the bellows 18. Thereafter the bellows 18 and lever portion 24 are urged towards the contracted condition of bellows 18 as is best illustrated in FIGURE 1.

The contractive movement of the bellows 18 causes any entrapped fluids within the bellows to be expelled via the outlet valve 21 while the inlet valve remains closed and prevents the ingress of any additional fluids. As the lever portion 24 moves in the direction indicated as *b* the movable contact 33 and the lever portion 26 are caused to move in the opposite direction indicated as *a* away from and out of contact with the fixed contact 32 to thereby open the switch 31.

When the switch is opened the source of electrical energy supplied to the heating element 17 through the leads 27, 28 and 29 will be interrupted to thereby de-energize the heating element. The entrapped medium within the bellows 16 immediately begins to contract allowing the bellows to return to its normal contracted condition. While the housing has been illustrated as being substantially solid, it can be appreciated that ventilating openings adjacent the bellows 16 can be provided to accelerate the cooling action of the entrapped fluid and to facilitate a faster contractive movement of the bellows. Concomitant with the contraction of bellows 16, the bellows 18 will tend to assume its normally expanded condition and will urge the lever portion 24 ahead of it in the direction indicated as *a* and, of course, the lever portion 26 will be caused to traverse an arcuate path in the direction indicated as *b*. When the lever 23 assumes the position indicated by the broken lines, the movable contact 33 will again make contact with the fixed contact 32 to close the switch 31 and the cycle will be repeated.

The expansive movement of the bellows 18 causes a vacuum to be created within the bellows. This vacuum creates a pressure drop across the inlet valve 19 urging it towards the open position while the pressure within the bellows creates a force upon the outlet valve causing it to remain closed. The vacuum or suction created within the bellows is transferred by the inlet valve 19 to the well or sump containing the fluids to be pumped or drawn into the bellows. Subsequent contracted movement of the bellows 18 will cause the entrapped fluids to be dispelled through the outlet valve 21 in the manner previously described.

In the pump embodiment 15 illustrated in FIGURE 2, there is located adjacent the housing extremity 14 a hermetically sealed bellows 34 which normally assumes an expanded condition. The bellows is filled with a medium such as an ethyl alcohol which has a high coefficient of expansion. Within the bellows 34 there is provided a thermal actuator means or exchanger member generally designated as 36 which is in thermal transfer contact with the entrapped medium. The thermal actuator means is intended to operate on either a heating or cooling principle. Since the pump has been designated for use with a home air-conditioning unit, it is possible to provide a flow of a coolant or a heated medium through the thermal actuator 36. If it is desired to provide a coolant through the thermal actuator, then the refrigerant in the air-conditioner unit can be tapped at or adjacent to the evaporator and bypassed from the normal coolant flow configuration. If it is desired that a heated medium be transferred through the thermal actuator, then the refrigerant can be tapped from the coolant circuits at a point adjacent to the compressor where it will carry a high heat content. In FIGURE 2 the thermal actuator is illustrated as operating on the cooling principle.

Supported within the housing 12, adjacent the housing extremity 13, is a second bellows 37. Bellows 37 normally tends to assume a contracted condition. Secured to the second bellows are ball-type inlet and outlet valves 38 and 39, respectively. The valves extend to the housing extremity and can be attached to tubing or conduit (not shown).

A passage 41 substantially centrally located on the housing 12 opens to the interior of the housing. Pivotally supported on the housing in the passage is a lever 42 having an elongated portion 43 extending into the housing cavity intercalated between the adjacent extremities of the bellows 34 and 37. A shortened portion 44 of the lever extends outwardly beyond the housing to provide an actuator for an interrupter switch generally designated as 46.

A valve 47 is operably connected to the thermal actuator means 36 and the switch 46.

A source of electrical energy is connected to the thermal actuator means by wire leads 48, 49 and 51. The lead 48 is directly connected between the source of electrical energy and the valve 47. The interrupter switch 46 is positioned adjacent the portion 44 of the lever 42 and is interposed between leads 49 and 51. The lead 49 is connected between the source of electrical energy and the movable contact 52 of the switch while the lead 51 is connected between the fixed contact 53 of the switch and the valve 47. In the illustration of FIGURE 2, as in the previous embodiment, the movable contact 52 is illustrated as a dependent lever-like means having contact with the lever portion 44 which applies the motivating force thereto. The reciprocal movement of the lever 42 responsive to the contractive and expansive movements of the bellows causes similar movements to be imparted to the movable contact 52 causing it to make and break with the fixed contact 53.

In operation, when the entrapped medium within the bellows 34 is cooled, the bellows contracts from its normally expanded condition. The bellows 34 in FIGURE 2 is illustrated in its contracted or cooled condition. Since the bellows is controllably confined within the housing, the only direction its contractive movement can take is away from the adjacent extremity of the contracted bellows 37. The contractive movement causes the bellows 34 to initially move away from the portion 43 of the lever 42. Thereafter the bellows 37 and the lever portion 43 move to the left in FIGURE 2 toward the expanded condition of the bellows 37.

The expansive movement of the bellows 37 causes a vacuum to be created within the bellows. This vacuum creates a pressure drop across the inlet valve 38 urging it to the open position while a pressure within the bellows creates a force upon the outlet valve 39 causing it to remain closed. The vacuum or suction created within the bellows is transferred by the inlet valve 38 to the well or sump containing the fluids to be pumped or drawn into the bellows. As the lever portion 43 moves in the direction indicated as *c* the movable contact 52 and the lever portion 44 are caused to move in the opposite direction indicated as *d* away from and out of contact with the fixed contact 53 to thereby open the switch 46.

When the switch is opened the source of electrical energy will be interrupted thereby de-energizing the valve 47. The entrapped medium within the bellows 34 immediately begins to warm up and expand causing the bellows to return to its normal expanded condition. Concomitant with the expansion of the bellows 34, the bellows 37 will be urged to its contracted condition and simultaneously the lever portion 43 will be urged ahead of it in the direction indicated as *d* and, of course, the lever portion 44 will be caused to traverse an arcuate path in the direction indicated as *c*. When the lever 42 assumes a position indicated by the broken lines the movable contact 52 will again make contact with the fixed contact 53 to close the switch 46 and the cycle will be repeated.

The contractive movement of the bellows 37 causes any entrapped fluids within the bellows to be expelled via the outlet valve 39 while the inlet valve 38 remains closed and prevents the ingress of any additional fluids.

While the embodiment in FIGURE 2 illustrates a valve which is of the normally closed type it can be readily appreciated that the valve can be of the normally open type. Energization of a normally open valve structure would require a switch structure similar to that illustrated in FIGURE 1. While two specific embodiments of the invention have been described and disclosed in the foregoing description, it will be understood that many and various modifications within the spirit of the invention may occur to those skilled in the art. Therefore, it is intended that no limitation be placed on the invention except as defined by the scope of the appended claims.

I claim:

1. A device of the character described comprising:
a hollow support housing;
a first bellows supported within the housing adapted for expansive and contractive movements;
a second bellows supported within the housing cooperating with said first bellows adapted for expansive and contractive movements, said first bellows adapted to assume a normally expanded condition and said second bellows adapted to be maintained in a normally contracted condition;
valve means in one of said bellows;
thermal actuator means cooperating with the other of said bellows adapted when energized to cause movement of said other bellows and substantially concomitant opposite movement of said one bellows; and
means, including means adapted to sense movements of the bellows, operatively connected to the thermal actuator means for alternately energizing and de-energizing the thermal actuator means responsive to said movements.

2. A device of the character set forth in claim 1 in which:
said other bellows is characterized as an airtight container containing therein an entrapped medium having a sufficient coefficient of expansion so that the alternate energization and de-energization of the thermal actuator means will cause expansive and contractive movements of said other bellows.

3. A device of the character set forth in claim 2 in which:
the thermal actuator means comprise an element within said other bellows in thermal contact with said entrapped medium; and
the means operatively connected to the thermal actuator means includes further a source of thermal energy.

4. A device of the character set forth in claim 1 wherein:
the thermal actuator means when energized causes the expansive movement of said other bellows and the substantially concomitant contractive movement of said one bellows.

5. A device of the character set forth in claim 1 wherein:
the thermal actuator means when energized causes the contractive movement of said other bellows and the substantially concomitant expansive movement of said one bellows.

6. A device of the character set forth in claim 1 in which the valve means in said one bellows comprises:
an inlet valve member adapted to permit the ingress of a fluid medium into said one bellows responsive to the suction created therein during said one bellows' expansive movement; and
an outlet valve member adapted to permit the egress of said fluid medium from said one bellows responsive to pressure generated therein during said one bellows' contractive movement.

7. A device of the character set forth in claim 3 in which said means operatively connected to the thermal actuator comprises:
a valve operably connected to the thermal actuator means for controlling the thermal energy;
a source of electrical energy;
switch means, including stationary and movable contact members connected between the valve and the source of electrical energy, said switch having switch open and switch close positions adapted for controlling valve actuation; and
a control lever member pivotally mounted on the housing having a first portion cooperating with the bellows whereby the expansive and contractive movements of the bellows cause pivotal movements of the lever, and having a second portion providing a motivating force for the switch movable contact member, said lever pivotal movements causing the movable contact member to reciprocate between the switch open and switch close positions and to engage the stationary contact member in the switch close position.

8. A device of the character described comprising:
a hollow support housing;
a first bellows supported within the housing adapted for expansive and contractive movements, said first bellows being adapted to assume a normally contracted condition;
a second bellows supported within the housing cooperating with said first bellows adapted for expansive and contractive movements, said second bellows being adapted to assume a normally expanded condition;

valve means in said second bellows;

heat generating means cooperating with said first bellows adapted when energized to cause the expansive movement of said first bellows and the substantially concomitant contractive movement of said second bellows; and means, including control means adapted to sense movements of the bellows, operatively connected to the heat generating means for alternately energizing and de-energizing said heat generating means responsive to said movements.

9. A device of the character set forth in claim 8 in which:

said first bellows is characterized as an airtight container containing therein an entrapped medium having sufficient coefficient of expansion so that the alternate energization and de-energization of the heat generating means will cause and allow expansive and contractive movements of said first bellows;

the heat generating means comprises and electrically energized heater element within said first bellows in thermal contact with said entrapped medium; and the means operatively connected to the heat generating means includes further a source of electrical energy.

10. A device of the character set forth in claim 8 in which:

the heat generating means comprises an electrically energized heater elements; and the means operatively connected to the heat generating means includes further a source of electrical energy.

11. A device of the character set forth in claim 9 in which said means operatively connected to the heat generating means comprise:

switch means, including stationary and movable contact members connected between the heater element and the source of electrical energy, said switch having switch open and switch close positions; and a control lever member pivotally mounted on the housing having a first portion cooperating with said bellows whereby the expansive and contractive movements of said bellows cause pivotal movements of the lever, and having a second portion providing a motivating force for the switch movable contact member, said lever pivotal movements causing the movable contact member to reciprocate between the switch open and switch close positions and to engage the stationary contact member in the switch close position.

12. A device of the character described comprising:

a hollow support housing;

a first bellows supported within the housing adapted for expansive and contractive movements, said first bellows being adapted to assume a normally expanded condition;

a second bellows supported within the housing cooperating with said first bellows adapted for expansive and contractive movements, said second bellows being adapted to be maintained in a normally contracted condition;

valve means in said second bellows;

cooling means cooperating with said first bellows adapted when energized to cause the contractive movements of said first bellows and the substantially concomitant expansive movement of said second bellows; and means, including control means adapted to sense movements of the bellows, operatively connected to the cooling means for alternately energizing and de-energizing said cooling means responsive to said movements.

13. A device of the character set forth in claim 12 in which:

said first bellows is characterized as an airtight container containing therein an entrapped medium having a sufficient coefficient of expansion so that the alternate energization and de-energization of the cooling means will cause and allow contractive and expansive movements of said first bellows;

the cooling means comprises an exchanger element within said first bellows in thermal contact with said entrapped medium;

a source of coolant;

a source of electrical energy;

control valve means operatively connected to the source of coolant and the source of electrical energy; and switch means operatively connected to the control valve means and the source of electrical energy for controlling the energization of the control valve means.

14. A pump of the character described comprising:

a hollow cylindrical housing closed at both extremities;

a first normally contracted bellows supported within the housing having one end of the bellows abutting one of said housing extremities and having its free end adapted for expansive and contractive movements away from and towards said one housing extremity;

a second normally expanded bellows supported within the housing having one end of said second bellows abutting the other of said housing extremities and having its free end adapted for expansive and contractive movements away from and towards said other housing extremity, said free ends of said bellows having a substantially end to end abutting relationship;

means having a sufficient coefficient of expansion permanently entrapped in said first bellows;

heat generating means in said first bellows for heating said entrapped means to cause the expansive movement of said first bellows and the contractive movement of said second bellows;

valve means in said one end of said second bellows adapted to allow the ingress and egress of a fluid to be pumped, said valve being responsive to the suction and pressure generated by the expansive and contractive movements of said second bellows;

means connecting the heat generating means to a source of energization; and control means connected to the heat generating connecting means adapted to sense movements of the bellows for alternately energizing and de-energizing the heat generating means responsive to sensed movements.

15. A pump of the character set forth in claim 14 in which:

a source of electrical energy comprises the source of energization for the heat generating means; and the heat generating means comprise an electrically actuated heater element in thermal contact with said entrapped fluid means.

16. A pump of the character set forth in claim 14 in which the control means comprise:

switch means in the connecting means between the source of energization and the heat generating means having switch open and switch close positions including:

a stationary contact member;

a movable contact member reciprocal between the switch open and switch close positions and engageable with the stationary contact member in the switch close position; and means responsive to the movements of the bellows for causing the reciprocal movement of the movable contact member.

17. A pump of the character set forth in claim 16 in which the means responsive to movement of the bellows comprise:

a member pivotally supported by the housing having first and second lever portions, said first lever portion projecting into the hollow cylindrical portion of the housing intermediate the free ends of said bellows whereby the expansive and contractive movements of the bellows cause pivotal movement of the member, said second lever portion engaging said switch means to motivate the movable contact member whereby the pivotal movement of the pivoted member causes reciprocal movable contact movements between the switch open and switch close positions.

18. A pump of the character described comprising:

a hollow cylindrical housing closed at both extremities;

a first normally expanded bellows supported within the housing having one end of the bellows abutting one of said housing extremities and having its free end adapted for expansive and contractive movements away from and toward said one housing extremity;

a second bellows supported within the housing adapted to normally be maintained in a contracted condition having one end of said second bellows abutting the other of said housing extremities and having its free end adapted for expansive and contractive movements away from and toward said other housing extremity, said free ends of said bellows having a substantially end to end abutting relationship;

means having a sufficient coefficient of expansion permanently entrapped in said first bellows;

cooling means in said first bellows for cooling said entrapped means to cause the contractive movement of said first bellows and the expansive movement of said second bellows;

valve means in said one end of said second bellows adapted to allow the ingress and egress of a fluid to be pumped, said valves being responsive to the suction and pressure generated by the expansive and contractive movements of said second bellows;

means, including a control valve, connecting the cooling means to a source of coolant;

means operatively connected to the bellows adapted to sense movements of the bellows; and switch means, including a source of electrical energy, operatively connected between the control valve and the means sensing the bellows' movements for alternately energizing and de-energizing the control valve responsive to the sensed movements.

No references cited.